United States Patent [19]

Koyama

[11] Patent Number: 5,088,029
[45] Date of Patent: Feb. 11, 1992

[54] SYSTEM FOR RESTRUCTURING INPUT/OUTPUT CONTROL SYSTEM

[75] Inventor: Susumu Koyama, Kawasaki, Japan

[73] Assignee: Fujitsu Limited, Kawasaki, Japan

[21] Appl. No.: 347,756

[22] Filed: May 5, 1989

[30] Foreign Application Priority Data

May 11, 1988 [JP] Japan .................. 63-114226

[51] Int. Cl.$^5$ .................. G06F 15/16; G06F 11/16
[52] U.S. Cl. .................. 395/275; 364/238.2;
364/238.3; 364/240.4; 364/240.5; 364/240.7;
364/260.1; 364/260.2; 364/265.1; 364/265.5;
364/266.5; 364/268.9; 364/269.2; 364/DIG. 1;
364/232.91
[58] Field of Search .................. 364/200, 900

[56] References Cited

U.S. PATENT DOCUMENTS

| | | | |
|---|---|---|---|
| 3,623,011 | 11/1971 | Baynard, Jr. ................ | 371/8.2 |
| 3,875,390 | 4/1975 | Eccles et al. ................ | 371/11.3 |
| 4,007,448 | 2/1977 | Sergeant et al. ............. | 364/200 |
| 4,228,496 | 10/1980 | Katzman et al. ............. | 371/11.3 |
| 4,608,688 | 8/1986 | Hansen et al. ............... | 371/11.3 |
| 4,644,538 | 2/1987 | Cooper et al. ............... | 371/11.3 |
| 4,736,339 | 4/1988 | Crabbe, Jr. .................. | 364/900 |
| 4,821,170 | 4/1989 | Bernick et al. ............... | 364/200 |
| 4,965,714 | 10/1990 | Knecht ........................ | 371/8.1 |
| 4,974,150 | 11/1990 | Long et al. .................. | 364/200 |
| 4,989,206 | 1/1991 | Dunphy, Jr. et al. .......... | 371/11.1 |

OTHER PUBLICATIONS

Richard Zemel et al., "DISPATCHER: An Intelligent Approach to Factory Control", proceedings of the 1986 American Control Conference, 18-20 Jun. 1986, pp. 152-155.
David R. Chesney et al., "Almost' Real-Time Diagnosis and Correction of Manufacturing Scrap Using an Expert System", pp. 223-229.

*Primary Examiner*—Allen R. MacDonald
*Assistant Examiner*—Robert S. Hauser
*Attorney, Agent, or Firm*—Staas & Halsey

[57] ABSTRACT

A system for restructuring an input/output control system having first and second input/output controllers each of which respectively connects a first or a second group of peripheral devices in a lower level and a data processing apparatus in an upper level, and controls data transfer operation between each of the corresponding group of peripheral devices and the data processing apparatus, wherein each of the first and second group of peripheral devices is also connected to the input/output controller corresponding to the other group of peripheral devices so as to realize a cross call function. Each of the first and second plurality of input/output controllers respectively holds its own control data, which is used for controlling a data transfer operation between the corresponding peripheral devices and the data processing apparatus. When a situation which requires its own input/output controller to be in an off-line state arises, that fact is notified to the other input/output controller and the control data held in its own input/output controller is transferred to the other input/output controller. The other input/output controller receives the transferred control data and restructures the control data so that the other input/output controller can control the data transfer operation between the data processing apparatus and all the peripheral devices which were originally under the control of the other input/output controller as well as all the devices originally under the control of the above input/output controller wherein the above situation has arisen.

8 Claims, 13 Drawing Sheets

Fig. 4

| I/O $15_1$ | I/O $15_5$ |
|---|---|
| I/O $15_2$ | I/O $15_6$ |
| I/O $15_3$ | I/O $15_7$ |
| I/O $15_4$ | I/O $15_8$ |

Fig. 6

| I/O $15_1$ | I/O $25_1$ |
|---|---|
| I/O $15_2$ | I/O $25_2$ |
| I/O $15_3$ | I/O $25_3$ |
| I/O $15_4$ | I/O $25_4$ |
| I/O $15_5$ | I/O $25_5$ |
| I/O $15_6$ | I/O $25_6$ |
| I/O $15_7$ | I/O $25_7$ |
| I/O $15_8$ | I/O $25_8$ |

SYSTEM FOR RESTRUCTURING INPUT/OUTPUT CONTROL SYSTEM

BACKGROUND OF THE INVENTION (1) Field of the Invention

The present invention relates to a system for restructuring an input/output control system having a plurality of input/output controllers when a situation arises which requires that one of the input/output controllers be in an off-line state.

The system according to the present invention is applicable to an input/output control system having a plurality of input/output controllers, wherein each of the input/output controllers respectively connects a group of peripheral devices in a lower level and a data processing apparatus in an upper level, and controls data transfer operations between each of the corresponding groups of peripheral devices and the data processing apparatus. Each group of peripheral devices which corresponds to one of the input/output controllers is also connected to the other input/output controller, so as to realize a cross call function.

(2) Description of the Related Art

In an information processing system, an input/output control system is provided to control the data transfer operation between the data processing apparatus (or system) and the peripheral devices which handle data used in the data processing apparatus (or system), e.g., magnetic disk devices or magnetic tape devices as external memory devices.

Often, a large number of external memory devices are connected to one or more data processing apparatuses (or systems). Therefore, a plurality of input/output controllers are provided to constitute an input/output control system.

Further, a cross call function is used in the input/output control system to improve an efficiency of access to the external memory devices. The cross call function enables the data processing apparatus (or system) to access a peripheral device through an input/output controller other than the input/output controller by which the peripheral device is usually controlled, when the input/output controller which usually controls the peripheral device is busy with a control operation for the other peripheral device.

FIG. 1 shows an example of the construction of an input/output control system.

In FIG. 1, reference numerals 10 and 20 each denotes a magnetic tape device controller as an input/output controller, and $11_1, 11_2, 11_3, \ldots, 21_1, 21_2, 21_3, \ldots$ each denotes a port which connects to an input/output channel (not shown) of one or a plurality of data processing apparatuses (or systems) in the upper level, e.g. a host computer. Reference numeral 3 denotes a data path between the magnetic tape device controllers 10 and 20, and reference numeral 4 denotes control lines connecting the magnetic tape device controllers 10 and 20. Reference numerals $15_1, 15_2, 15_3, \ldots, 25_1, 25_2, 25_3, \ldots$ denote a magnetic tape device as an external memory device, 13 denotes a bus connecting the magnetic tape device controller 10 and the magnetic tape devices $15_1, 15_2, 15_3, \ldots$, reference numeral 23 denotes a bus connecting the magnetic tape device controller 20 and the magnetic tape devices $25_1, 25_2, 25_3, \ldots$, reference numeral 14 denotes a bus connecting the magnetic tape device controller 10 and the magnetic tape devices $25_1, 25_2, 25_3, \ldots$, reference numeral 24 denotes a bus connecting the magnetic tape device controller 20 and the magnetic tape devices $15_1, 15_2, 15_3, \ldots$, and reference numerals 12 and 22 each denote a port which connects the corresponding magnetic tape device controller 10, 20 to the magnetic tape devices 15, 25.

In the construction as shown in FIG. 1, usually, the magnetic tape devices $15_1, 15_2, 15_3, \ldots$ are under the control of the magnetic tape device controller 10, and the magnetic tape devices $25_1, 25_2, 25_3, \ldots$ are under the control of the magnetic tape device controller 20. Therefore, the magnetic tape device controller 10 holds control data which is used for the input/output control of the magnetic tape devices $15_1, 15_2, 15_3, \ldots$, and the magnetic tape device controller 20 holds control data which is used for the input/output control of the magnetic tape devices $25_1, 25_2, 25_3, \ldots$.

The cross call function operates i the above construction as follows. When a magnetic tape device controller 10 or 20 receives an input/output (I/O) command to access a magnetic tape device which is usually under the control of the magnetic tape device controller 10 or 20 from an input/output channel of a data processing apparatus (or system) in the upper level through one of the plurality of ports $11_1, 11_2, 11_3, \ldots, 21_1, 21_2, 21_3, \ldots$, the magnetic tape device controller sets a flag indicating the magnetic tape device is accessed, and starts an operation of input/output control for the input/output (I/O) command.

While a magnetic tape device controller is performing the operation of input/output control for an input/output (I/O) command, the magnetic tape device controller can not carry out other control operations for another input/output (I/O) command. In the above situation, the cross call function operates.

Namely, if a request to access a magnetic tape device is provided over the input/output channel of a data processing apparatus to the magnetic tape device controller 10 which is busy with the control operation for another input/output (I/O) command then, the input/output channel sends the input/output (I/O) command to the other magnetic tape device controller 20.

When the magnetic tape device controller 20 receives the input/output (I/O) command, the magnetic tape device controller 20 realizes that the input/output (I/O) command is not requesting the magnetic tape devices under its own magnetic tape device controller 20, and inquires of the other magnetic tape device controller 10 whether or not the magnetic tape device requested for access is busy.

When the magnetic tape device controller 10 receives the above inquiry from the other magnetic tape device controller 20, the magnetic tape device controller 10 checks a flag table which includes flags indicating whether or not each magnetic tape device under the control of its own magnetic tape device controller 10 is busy. If the magnetic tape device requested is not busy, the magnetic tape device controller 10 steps the flag of the magnetic tape device, and then informs the other magnetic tape device controller 20 which has output the inquiry, that the requested magnetic tape device is available.

When the magnetic tape device controller 20 receives the above information of the availability of the magnetic tape device, ti starts an input/output control operation for the input/output (I/O) command using necessary control data for the magnetic tape device. Although the control data is usually held in the magnetic tape device controller 10, it is sent from the magnetic tape device controller 10 to the magnetic tape device controller 20.

When the control operation by the magnetic tape device controller 20 is completed, the magnetic tape device controller 20 informs the other magnetic tape device controller 10 of the completion of the operation, and the magnetic tape device controller 10 resets the flag for the magnetic tape device, and thus the cross call operation is completed.

As mentioned above, in the conventional input/output control system, while one (called first) input/output controller (magnetic tape device controller) controls data transfer between a data processing apparatus (or system) in the upper level and a peripheral device (magnetic tape device) which is usually under the control of the other (called second) input/output controller (magnetic tape device controller), the cooperation of the second input/output controller (magnetic tape device controller) is resetting the flag for the requested peripheral device (magnetic tape device), and communicating with the first input/output controller (magnetic tape device controller).

The above cooperation is possible only when the input/output controller (magnetic tape device controller) which holds control data including the above-mentioned flags for the peripheral device (magnetic tape device), is in an ON state during the cross call operation.

However, sometimes a situation may arise that requires its own input/output controller to be in an off-line state, for example, when a malfunction has occurred in tis own input/output controller, when its own input/output controller is order to be in an off-line state, or when its own input/output controller is ordered to power off.

Thus, in the prior art, the cross call function cannot operate in these situations because an access to a peripheral device under the control of the input/output controller which is in an off-line state is impossible.

SUMMARY OF THE INVENTION

The object of the present invention is to provide a system for restructuring an input/output control system wherein a data processing apparatus in the upper level can access a peripheral device which was originally under the controller of an input/output controller which is in an off-line state, and the usability of an input/output control system is improved.

According to the present invention, there is provided a system for restructuring an input/output control system having first and second input/output controller each of which respectively connects a first or a second group of peripheral devices in a lower level and a data processing apparatus in an upper level, and controls a data transfer operation between each of the corresponding groups of peripheral devices and the data processing apparatus, wherein each of the first and second groups of peripheral devices is also connects to the input/output controller corresponding to the other group of peripheral devices; each of the first and second input/output controllers respectively comprising: a first or second memory unit each or usually holding first or second control data, respectively, the first or second control data is used for controlling a data transfer operation between the corresponding peripheral devices and the data processing apparatus; a first or second off-line situation notifying unit each for notifying an arising of a situation which requires its own input/output controller to be in an off-line state, to the other input/output controller; a first or second no-response status indicating unit each for indicating a no-response status of its own input/output controller, when the situation requires its own input/output controller to be in an off-line state arises; a first and second temporary stopping unit each for temporarily stopping a reception of a new I/O command in its own input/output controller, when its own input/output controller receives notification of an arising of the above situation from the other input/output controller; a first and second temporary stop notifying unit each for notifying a state of the temporary stop of its own input/output controller to the other input/output controller; a first or second control data transfer unit each for transferring the control data held in the corresponding one of the first and second memory unit to the other one of the first and second memory unit, when its own input/output controller receives the notification of the temporary stop from the other input/output controller; a first or second off-line unit each for carrying out an off-line operation of its own input/output controller after the completion of the transfer of the first or second control data; and a first or second restriction unit each for receiving the transferred control data from the other input/output controller and restructing the control data held i its own memory unit and the control data transferred, so that its own input/output controller can control both the first and second peripheral devices.

BRIEF DESCRIPTION OF THE DRAWINGS

FIG. 4 is a diagram of an example of the assignment of the region of the buffer memory 56 in the construction of FIG. 3 in a normal state;

FIG. 6 is a diagram of an example of the assignment of the region of the buffer memory 56 in the construction of FIG. 3 in an off-line state;

DESCRIPTION OF THE PREFERRED EMBODIMENTS

Figure 2:
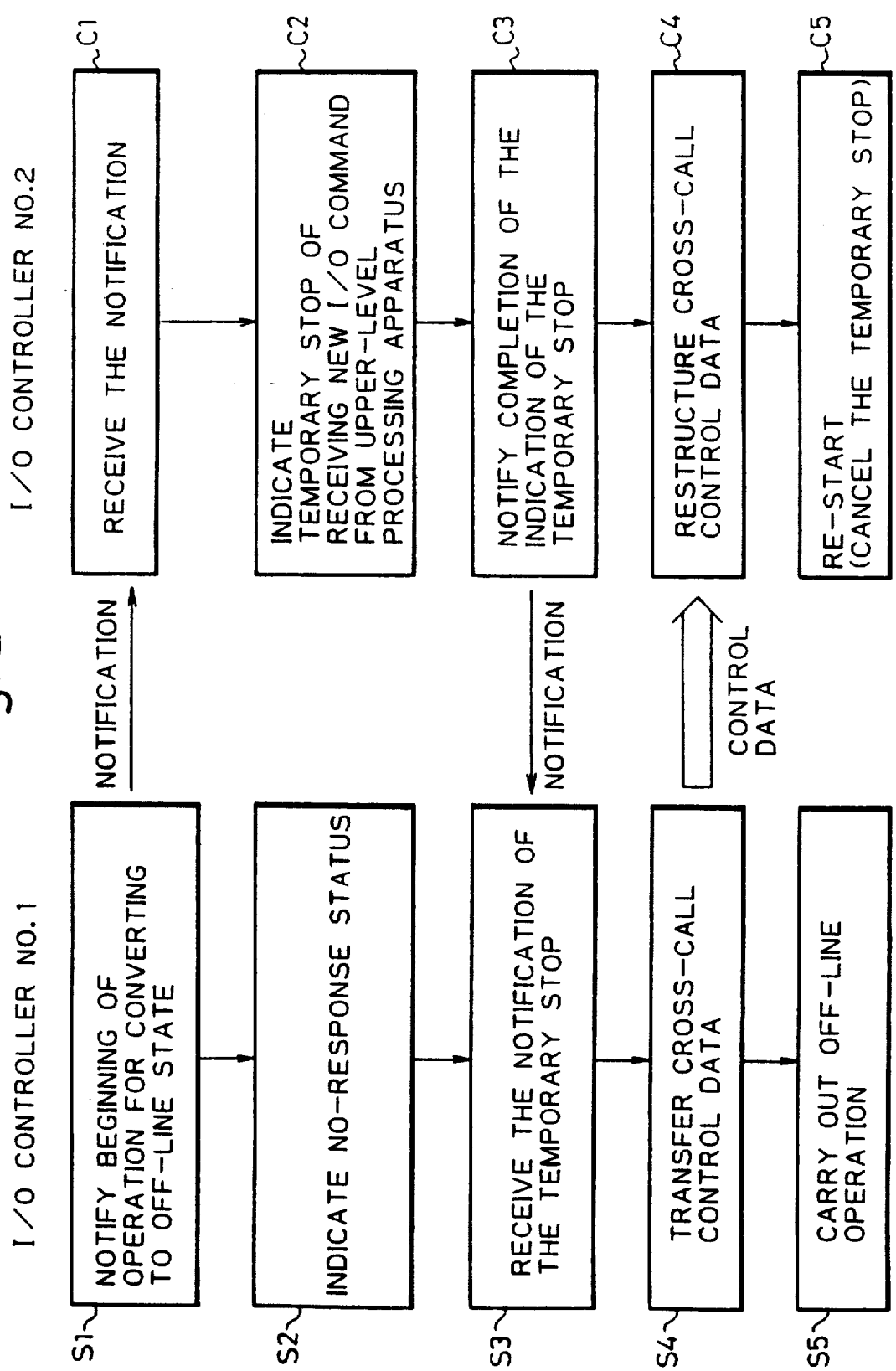
FIG. 2 shows a basic flow chart of the operation carried out in the system according to the present invention.

FIG. 2 shows the basic sequence of the operation for restructuring an input/output control system which is carried out by the input/output controller constituting the input/output control system according to the present invention.

In FIG. 2, two input/output controller No. 1 and No. 2 are shown. Input/output controller No. 1 is an input- /output controller wherein a situation which requires its own input/output controller to be in an off-line state arises, and input/output controller No. 2 is an input/output controller wherein a new input/output control system is to be restructured for accessing the peripheral devices under the control of the other input/output controller which is required to be in an off-line state, in an embodiment of the present invention. The steps of the operation carried out by the input/output controller No. 1, are denoted by S1, S2, . . . S5, and the steps of the operation carried out by the input/output controller No. 2, is denoted by C1, C2, . . . C5.

In the first step S1, when a situation which requires its own input/output controller to be in an off-line state has arisen in the input/output controller No. 1, the input/output controller No. 1 notifies that fact to the input/output controller No. 2. In other words, the input/output controller No. 2 is notified of a start of an operation to convert the state of the input/output controller No. 1 to an off-line state according to the present invention.

In the second step S2, after the above operation of the step S1, the input/output controller No. 1 indicates a no-response status so that a data processing apparatus, which potentially has a request to access a peripheral device under the control of the input/output controller No. 1, can recognize that the input/output controller No. 1 is in an off-line state.

In the step C1, the input/output controller No. 2 receives the notification made in the step S1 of the input/output controller No. 1. Next, in the step C2, the input/output controller No. 2 indicates that the input/output controller No. 2 temporarily stops a reception of a new input/output (I/O) command from a data processing apparatus, so that the data processing apparatus can recognize that the input/output controller No. 2 is busy.

In the step C3, after the above operation of the step C2, the input/output controller No. 2 notifies the arising of the above situation to the input/output controller No. 1, in other words, notifies the completion of the indication of the temporary stop to the input/output controller No. 1.

In the step S3, the input/output controller No. 1 receives the notification made in the step C 3 of the input/output controller No. 2. Next, in the step S4, the input/output controller No. 1 transfers the control data used for the cross call operation (data necessary for the input/output controller No. 2 to control the peripheral devices which are originally under the control of the input/output controller No. 1) to the input/output controller No. 2.

Then, in the step S5, the input/output controller No. 1 carries out the off-line operation of its own input/output controller.

The input/output controller No. 2 receives the cross call control data transferred in the step S4 from the input/output controller No. 1, and in the step C4, the input/output controller No. 2 restructures all of the control data including the transferred cross call data and control data held in its own controller for controlling the peripheral devices which are originally under the control of the input/output controller No. 2. Hence, the input/output controller No. 2 can control both the peripheral devices originally under the control of the input/output controller No. 1 and the peripheral devices originally under the control of the input/output controller No. 2.

Then, in the step C5, the input/output controller No. 2 cancels the indication of the temporary stop, and re-starts the operation of input/output control of both of the peripheral devices originally under the control of the input/output controller No. 1 and the peripheral devices originally under the control of the input/output controller No. 2.

According to the above operation, a data processing apparatus in the upper level can access a peripheral device which was originally under the control of an input/output controller which is in an off-line state. Thus, the usability of an input/output control system is improved.

Each of the input/output controller which constitute the system for restructuring an input/output control system according to the present invention have a construction which realizes the above functions of the input/output controllers No. 1 and No. 2. That is each input/output controller can function as the input/output controller No. 1 when a situation which requires its own input/output controller to be in an off-line state arises, or can function as the input/output controller No. 2 when the above situation occurs in the other input/output controller.

Figure 3:
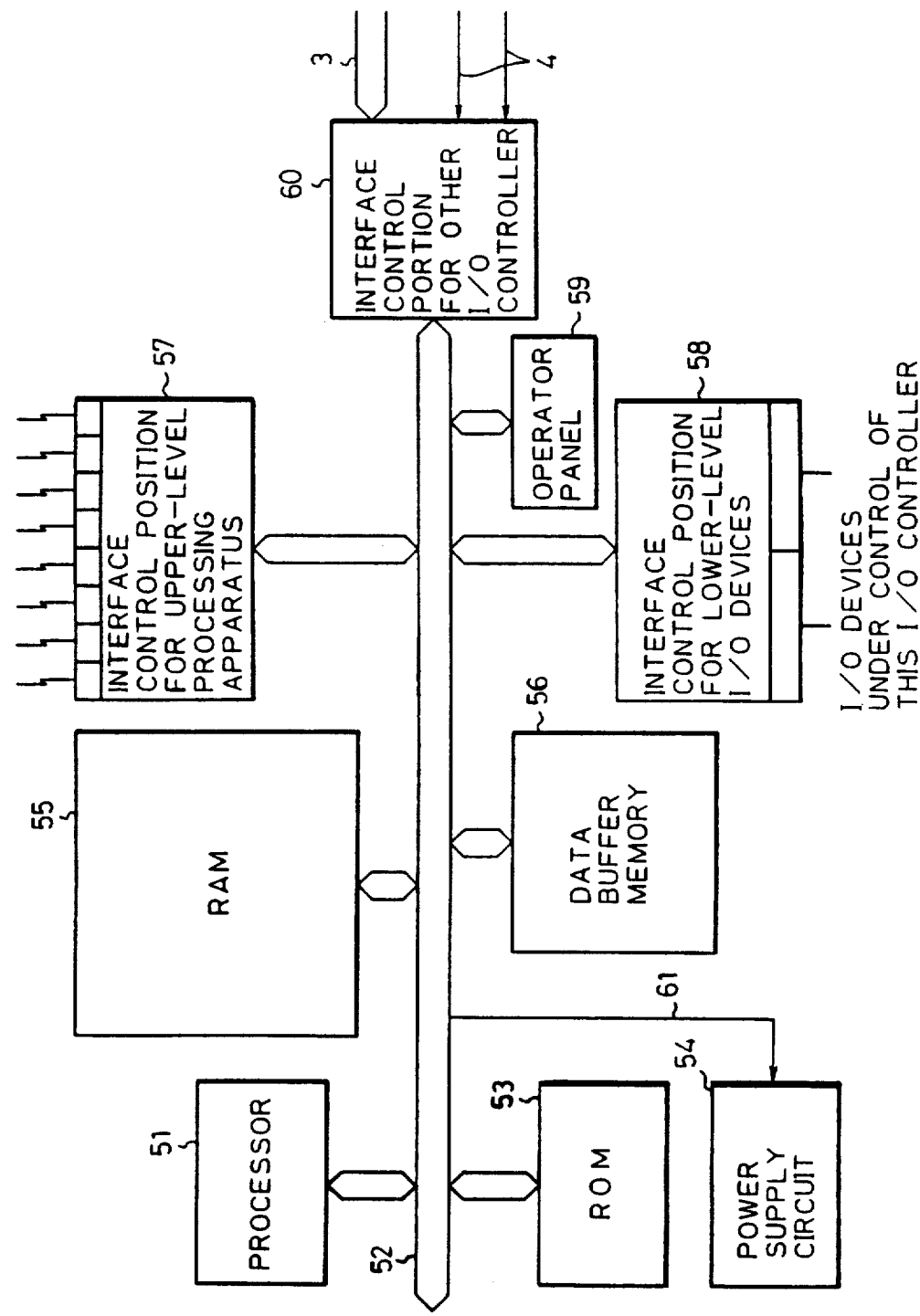
FIG. 3 is a block diagram illustrating the construction of the input/output controller in an embodiment of the present invention.

FIG. 3 shows the construction of the input/output controller, which realizes the magnetic tape device controller 10 or 20, in an embodiment of the present invention.

In FIG. 3, reference numeral 51 denotes a microprocessor, 52 denotes a bus, 53 denotes a ROM, 54 denotes a data buffer memory, 57 denotes an interface control portion for one or a plurality of data processing apparatuses connected in the upper level, 58 denotes an interface control portion for peripheral (input/output) devices connected in the lower level, 59 denotes an operator panel, 60 denotes an interface control portion for the other input/output controller, 61 denotes a control line to control the electric power supply circuit 54, 3 denotes a data path between the other input/output controller, and 4 denotes control lines between the other input/output controller.

Figure 1:
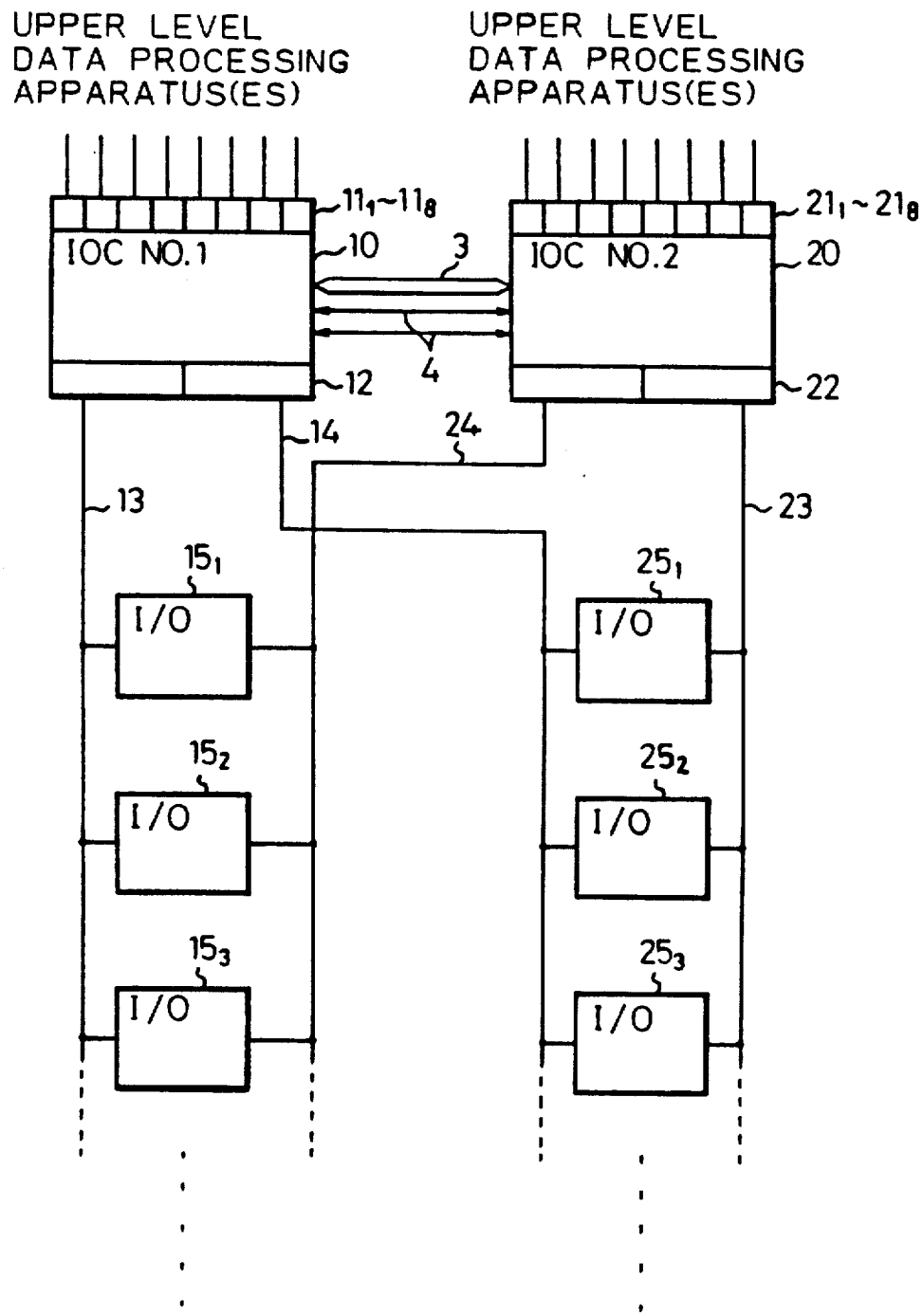
FIG. 1 is a block diagram of the construction of an input/output control system.

In the embodiment shown in FIGS. 1 and 3, the input/output controllers 10 and 20 each has eight input/output ports in each of the upper level side and the lower level side. Thus, the input/output controller 10 and 20 can be connected to eight input/output channels of one or a plurality of data processing apparatuses (or systems), and can be connected to eight peripheral devices in the lower level side.

In the construction of FIG. 3, the microprocessor 51 operates in accordance with a microprogram which is held in the ROM 53, and controls the whole operation of the input/output controller of FIG. 3.

The interface control portion 57 controls the data input/output operation with the data processing apparatus (or system) in the upper level, and has eight ports connected with the input/output channel of the data processing apparatus (or system). The interface operation with the peripheral devices in the lower level, and has eight ports each connected with an peripheral device.

The interface control portion 60 controls the data input/output operation with the other input/output controller.

The power supply circuit 54 supplies electric power to the whole construction of the input/output controller. The ON and OFF operation of the power supply circuit 54 is controlled by the microprocessor 51.

The operator panel 59 is used by the operator to manually input various commands, for example, to command the input/output controller to be in an off-line state, or to command to the input/output controller to be in an on-line state.

The data buffer memory 56 is used for temporarily holding data which has been sent from one side (the upper level or the lower level) until sending it out to the other side. For example, when magnetic tape devices are connected as peripheral devices, the data which is to be written o the magnetic tape is received and held in the data buffer memory 56 in advance of being written on the magnetic tape in the streaming mode. Likewise, the data read from the magnetic tape is held in the data buffer memory 56 in advance of being transferred to the data processing apparatus (or system) in the upper level.

A region of the data buffer memory 56 is assigned to each of the peripheral devices which are originally (normally) under the control of its own input/output controller. An example of the assignment of the regions is shown in FIG. 4, wherein the divided regions are denoted by I/O $15_1$, $15_2$, $15_3$, . . . correspond to the peripheral devices $15_1$, $15_2$, $15_3$, . . . which are originally under the control of input/output controller (magnetic tape device controller) in FIG. 1.

Figure 5:
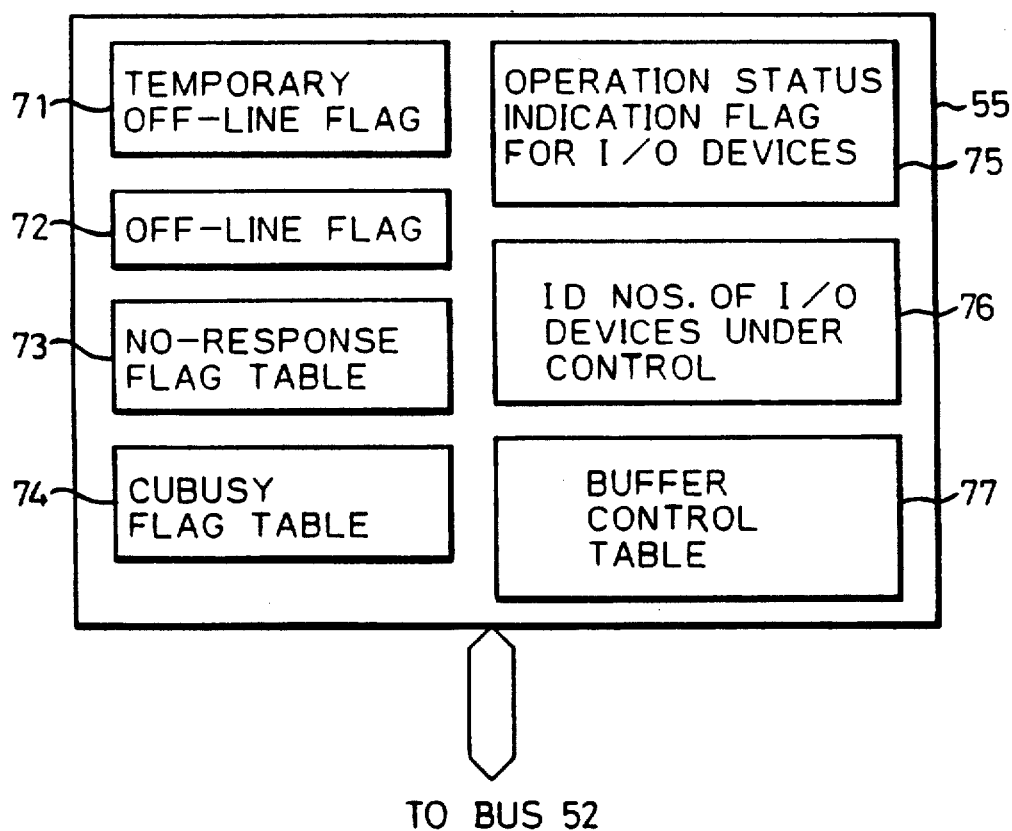
FIG. 5 is a block diagram illustrating an example of the contents of the RAM 55.

The RAM 55 stores various control data for the input/output controller to operate. The typical contents of the RAM 55 are shown in FIG. 5, wherein reference numeral 71 denotes a temporary off-line flag, 72 denotes an off-line flag, 73 denotes a no-response flag table, 74 denotes a CUBUSY flag table, 75 denotes a table of the operation status indication flags for I/O devices, 76 denotes a table of the I.D. numbers of the I/O devices under the control of the input/output controller, and 77 denotes a buffer control table.

The temporary off-line flag 71 indicates whether or not the input/output controller is required to be in a temporary off-line state. The off-line flag 72 indicates whether or not the input/output controller is required to be in an off-line state.

The no-response flag table 73 has a bit for each of the ports which connect the input/output controller with the data processing apparatus (or system) in the upper level. Each bit indicates whether or not an off-line signal is output through the corresponding one of the ports, wherein the off-line signal is a code signal which indicates that the input/output controller is in an off-line state. Therefore, the input/output channel of the data processing apparatus (or system) in the upper level which channel is connected through the port, recognizes that the input/output controller is in an off-line state.

Similarly, the CUBUSY flag table 74 has a bit for each of the ports which connect the input/output controller with the data processing apparatus (or system) in the upper level. Each bit indicates whether or not a CUBUSY signal is output through the corresponding one of the ports, where the CUBUSY signal is a code signal which indicates that the input/output controller is in a CUBUSY state. Therefore, the input/output channel of the data processing apparatus (or system) in the upper level which channel is connected through the port, recognizes that the input/output controller is busy with an operation for the other input/output (I/O) command which has been last received. When the data processing apparatus (or system) in the upper level detects the CUBUSY signal, the data processing apparatus (or system) waits a predetermined time, and then sends the input/output (I/O) command again.

The table of operation status indicating flags for I/O devices 76 indicates whether or not each peripheral device which is under the control of the input/output controller is in use (is accessed).

The buffer control table 77 holds the control data to use the assigned region of the data buffer memory 56 for each of the I/O devices under the control of the input/output controller. For example, the control data may include the top element address of the assigned region, the capacity of the assigned region, and the available (not occupied) region in the assigned region, or the like.

FIGS. 7 to 14 show operations which are carried out in the input/output controller having the construction of FIG. 3. The operations are carried out, for example, when a malfunction occurs in the input/output controller, when the input/output controller receives a power-off command, or when the processor realizes that an off-line command is input from the operator panel.

Further, the operations are carried out under the control of the microprocessor 51 in accordance with a microprogram, with the operations shown in each of FIGS. 7 to 14 defining a routine.

First, the operations of the input/output controller in an embodiment of the present invention when a situation which requires its own input/output controller to be in an off-line state arises, are explained with reference to FIGS. 7 to 10.

Figure 7:
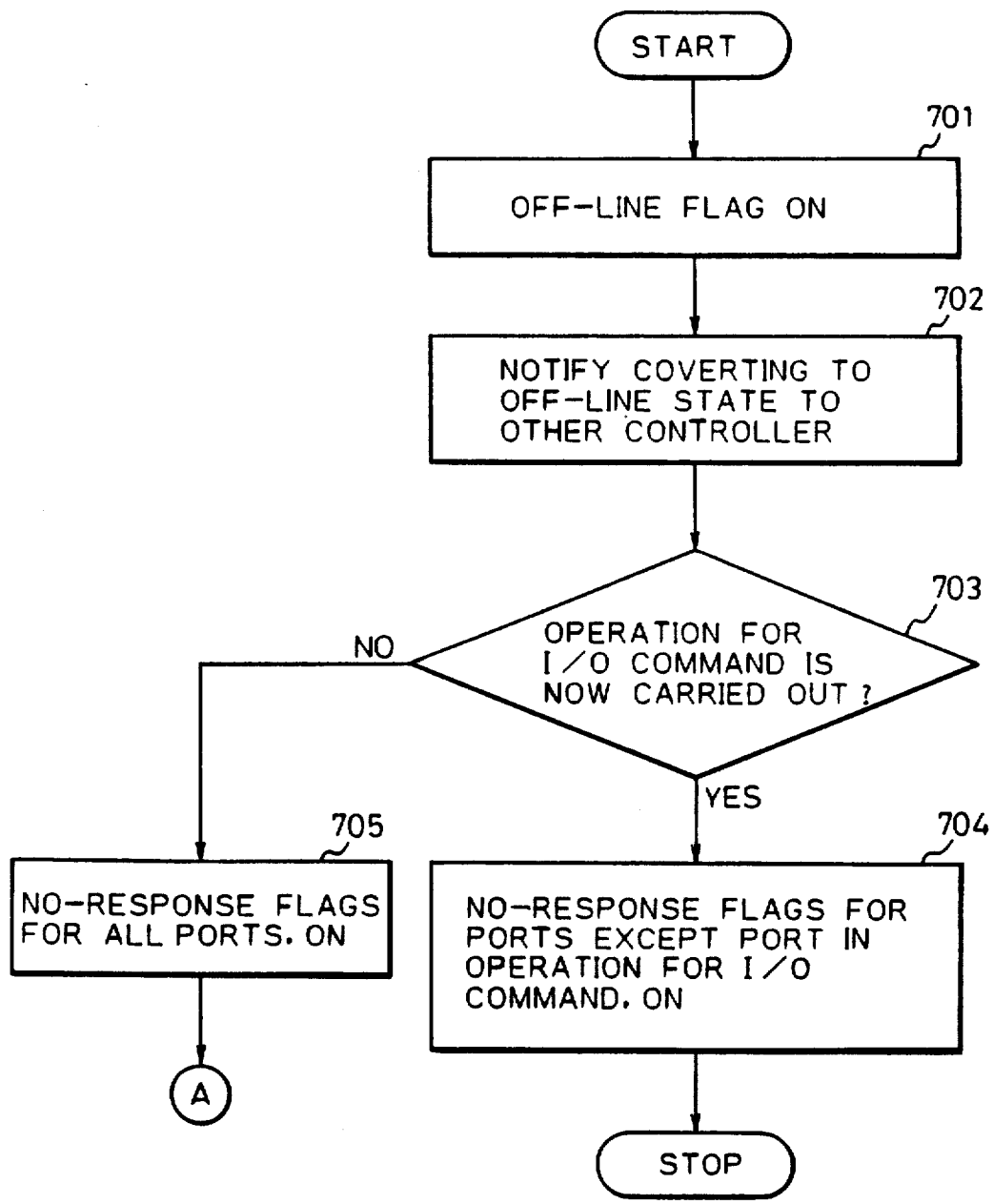
FIG. 7 to 10 are flow charts illustrating carried out in an input/output controller in an embodiment of the present invention when a situation which requires its own input/output controller to be in an off-line state arises.

The flow of the operation shown in FIG. 7 starts when a situation arises requiring its own input/output controller to be in an off-line state.

In the step 701 shown in FIG. 1, the input/output controller sets the off-line flag.

In the step 702, the input/output controller notifies the other input/output controller of the start of the converting operation to an off-line state. The step is achieved, for example, using the interface control portion 60 and the control line 4 shown in FIG. 3.

In the step 703, the input/output controller determines whether or not the operation for an input/output (I/O) command is carried out at that time.

If it is determined that an operation for an input/output (I/O) command is carried out in the input/output controller at the step 703, the input/output controller sets no-response flags for all the ports connecting with the data processing apparatus (or system) in the upper level, except for the port through which the operation for the input/output (I/O) command is carried out in the step 704, thus completing operation of FIG. 7.

Figure 10:
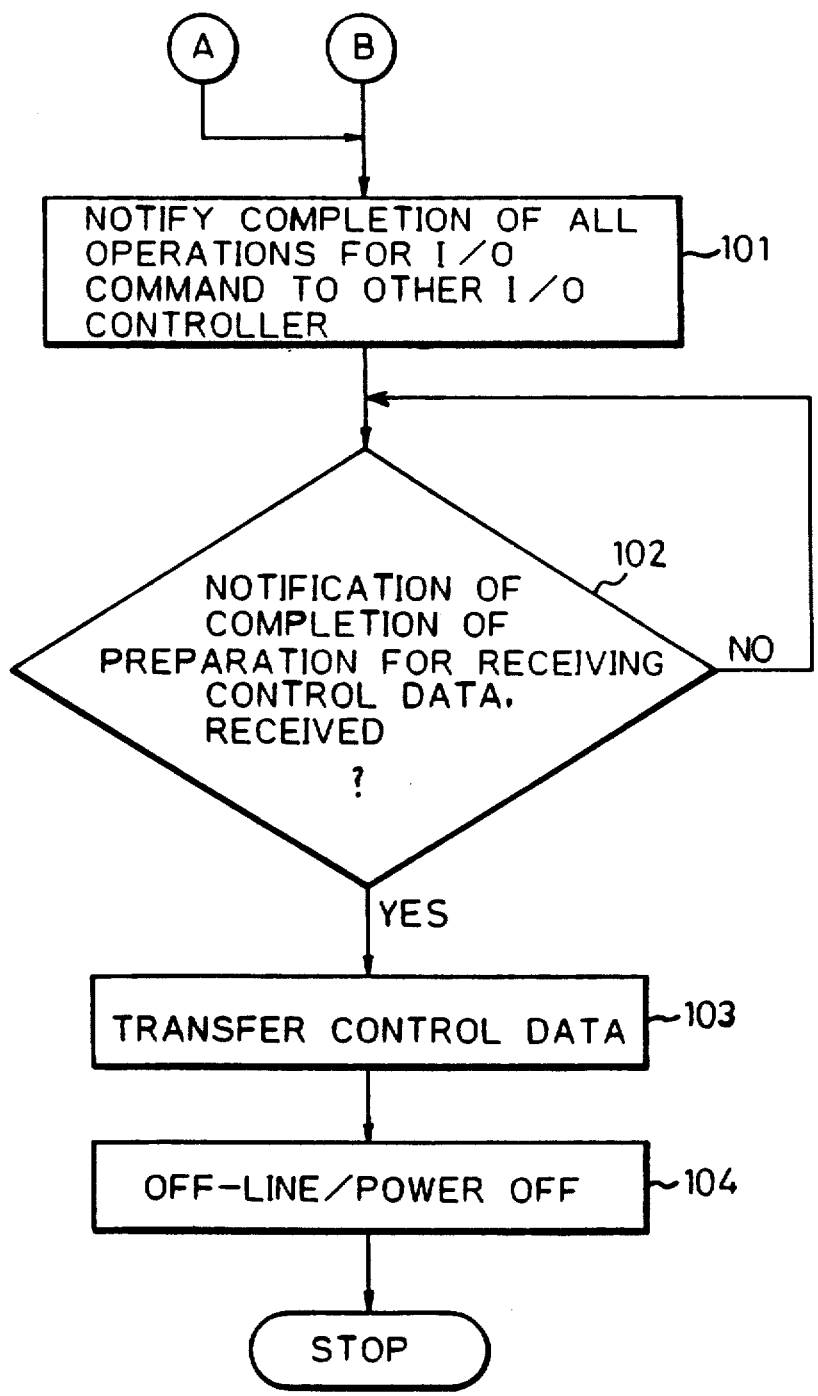

If it is determined that no operation for an input/output (I/O) command is carried out in the input/output controller at the step 703, the input/output controller steps no-response flags for all the ports connecting with the data processing apparatus (or system) in upper level in the step 705, and then the operation goes to the step 101 shown in FIG. 10.

In the above steps 704 and 705, the no-response flags exist in the no-response flag table in FIG. 5, and when the no-response flag is set for a port, in practice, a signal indicating the no-response state is output through the port to the input/output channel of the data processing apparatus (or system) in the upper level. Therefore, the input/output channel realizes that the input/output controller is in the no-response state, and as a result, the input/output does not send an input/output (I/O) command to the input/output controller while the signal is output.

Figure 8:
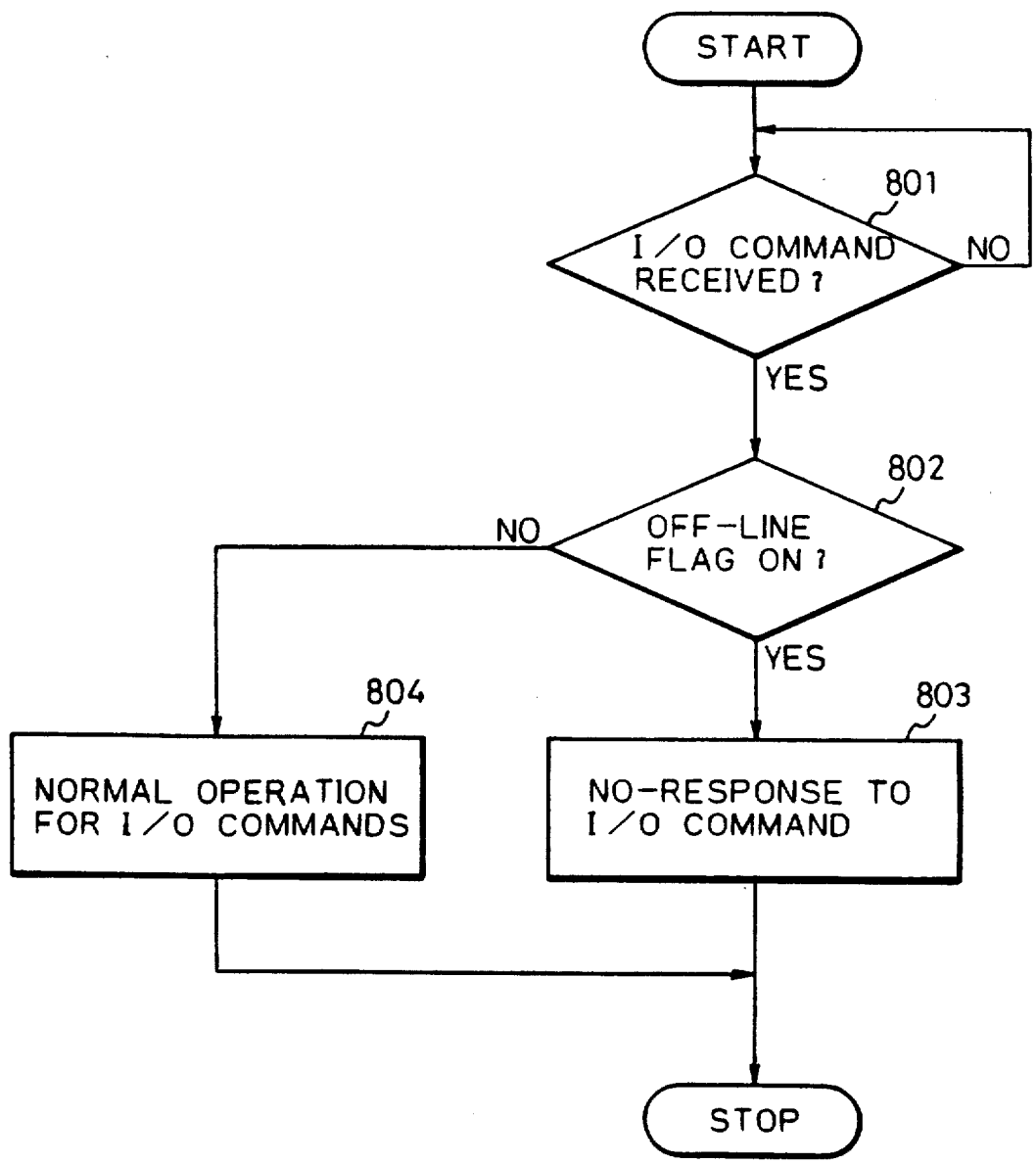

FIG. 8 shows the operation of the input/output controller when the input/output controller receives an input/output (I/O) command.

In the step 801 shown in FIG. 8, the input/output controller determines whether or not the input/output controller received an input/output (I/O) command.

If it is determined that an input/output (I/O) command is received in the step 801, the operation goes to the step 802. However, if it is determined that an input/output (I/O) command is not received at the step 801, the input/output controller waits a reception of an input/output (I/O) command at the step 801.

In the step 802, the input/output controller determines whether or not the off-line flag 72 in the RAM 55 in the input/output controller is ON.

If it is determined that the off-line flag 72 is ON, the operation goes to the step 803. Or if it is determined that the off-line flag 72 is OFF, the operation goes to the step 804.

In the step 803, the input/output controller does not answer the input/output (I/O) command, while the signal indicating a no-response state corresponding to the ON state of the no-response state corresponding to operation of FIG. 8.

In the step 804, the input/output controller carries out a normal operation for the input/output (I/O) command, as the no-response flag is OFF, thus completing the operation of FIG. 8.

Figure 9:
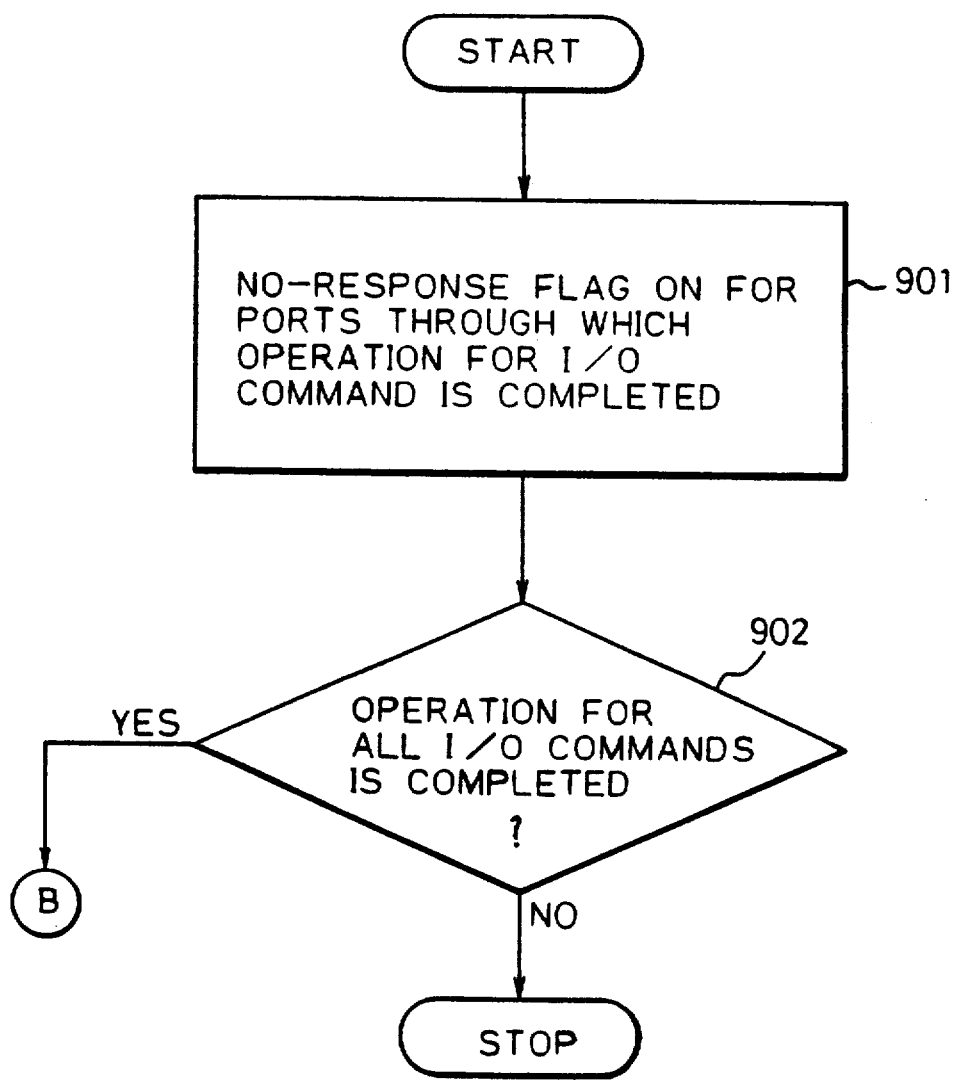

FIG. 9 shows the operation of the input/output controller after the aforementioned operation for the input/output (I/O) command of the step 703 of FIG. 7 is completed. The input/output (I/O) command generally has a form wherein a series of input/output (I/O) commands are chained. In the above operation, the series of input/output (I/O) commands which are chained to each other are deemed as one input/output (I/O) command.

When the above-mentioned operation for the input/output (I/O) command through the port is completed, then in the step 901 shown in FIG. 9, the input/output controller sets the no-response flag for the port. The operation then proceeds to the step 902.

In the step 902, the input/output controller determines whether or not the operations for all the input/output (I/O) commands which have been received are completed. This determination is carried out by checking the no-response flags for all the ports in the no-response flag table 73.

If it is determined in the steps 902 that the operations for all the input/output (I/O) commands which have been received are completed, the operation goes to the step 101 of FIG. 10. Or if it is determined that an operation for all the input/output (I/O) commands which have been received is not completed, the operation of FIG. 9 is completed.

FIG. 10 shows the off-line operation of the input/output controller after all the operations for the input/output (I/O) commands are completed.

After the operations of the step 705 in FIG. 7 and step 902 of FIG. 9, the operation proceeds to the step 101 of FIG. 10. In the step 101, input/output controller notifies the other input/output controller that all the operations for all the input/output (I/O) commands which have been received are completed. Then, in the step 102, the operations waits for a notification (signal), indicating that the other input/output controller can receive the cross call (control) data, which is sent from the other input/output controller.

If it is determined that the above notification (signal), indicating that the other input/output controller can receive the cross call (control data, sent from the other input/output controller is received at the step 102, then the operation goes to the step 103. In the step 103, the input/output controller transfers a set of cross call control data including the contents of the table of the I.D. numbers of the I/O devices under the control of the input/output controller 76 and the buffer control table 77 to the other input/output controller.

In the step 104, the input/output controller carries out an off-line operation. That is, the input/output controller controls the power supply circuit 54 by sending a power-off signal from the microprocessor 51 to the power supply circuit 54, or, if a power-off is unnecessary, the microprocessor controls the operator panel 59 to display that the input/output controller is in an off-line state.

FIGS. 11 to 14 shows an operation which is carried out in an input/output controller in the embodiment of the present invention, wherein a new input/output control system is to be restructured for accessing the peripheral devices under the control of the other input/output controller which is required to be in an off-line state.

Figure 11:
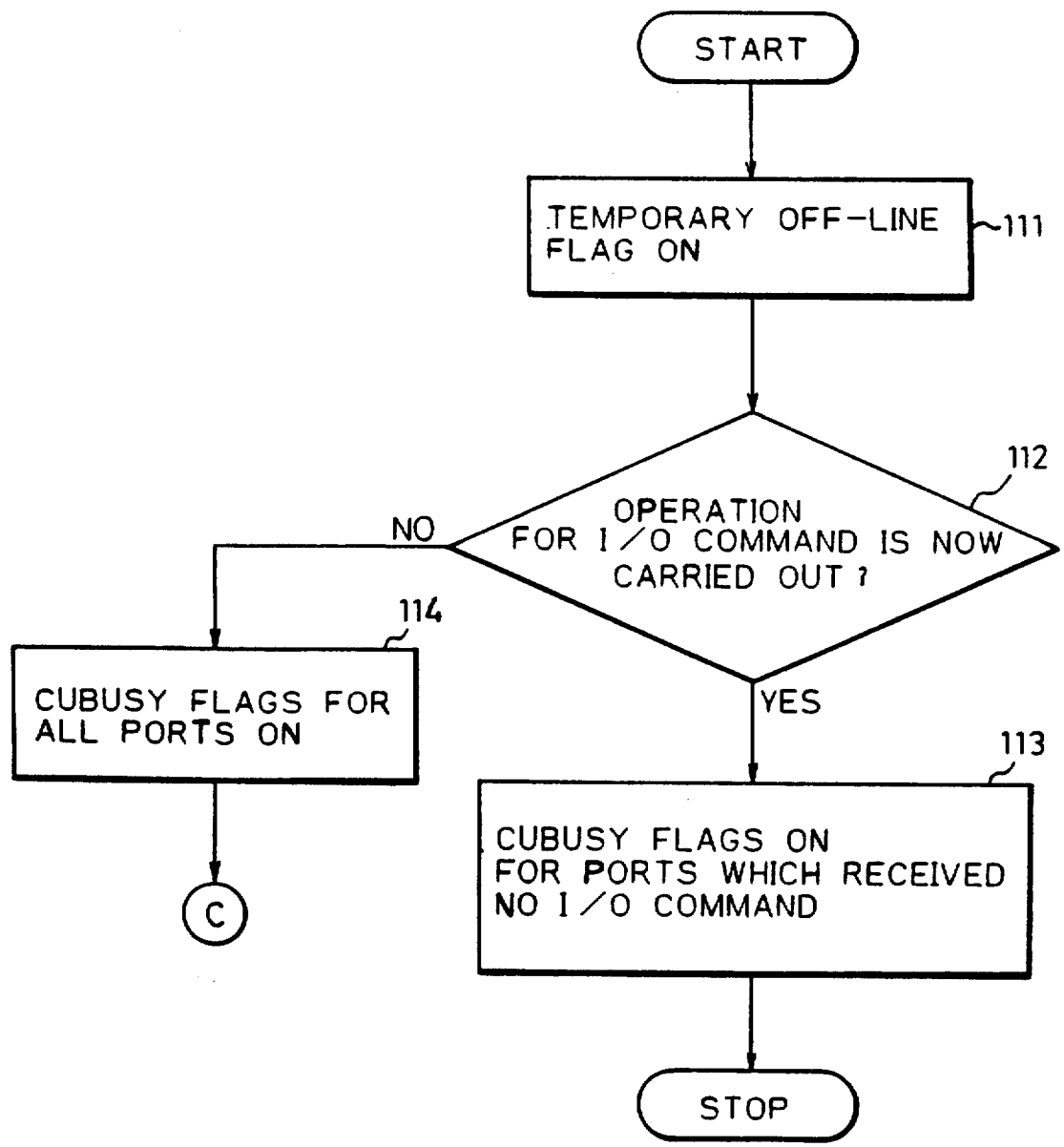
FIG. 11 to 14 are flow charts illustrating carried out in an input/output controller in an embodiment of the present invention, wherein a new input/output control system is to be restructured for accessing the peripheral devices under the control of the other input/output controller which is required to be in an off-line state.

The operations of the input/output controller shown in FIG. 11 start when the input/output controller receives that the aforementioned notification which is made at the step 702 of FIG. 7 by the other input/output controller (the input/output controller which carries out the operation of FIGS. 7 to 10).

In the step 111 of FIG. 11, when the input/output controller receives the above notification, the input/output controller sets the temporary off-line flag in the RAM 55 shown in FIG. 3.

The above notification is received at the microprocessor through the control line 4 and the interface control portion 60 shown in FIG. 3, as an interrupt.

In the step 112, the input/output controller determines whether or not an operation for an input/output (I/O) command is carried out at that time.

If it is determined that an operation for an input/output (I/O) command is carried out in the input/output controller at the step 112, then in the step 113 the input/output controller sets the CUBUSY flags for all the ports connecting the data processing apparatus (or system) in the upper level, except the port through which the operation for the input/output (I/O) command is carried out. After the step 113, the operation of FIG. 11 is completed.

As mentioned before in the explanation of the CUBUSY flags with reference to FIG. 5, when the CUBUSY flag is ON, the CUBUSY signal is output through the flag is ON, the CUBUSY signal is output through the corresponding one of the ports. Therefore, the input/output channel of the data processing apparatus (or system) in the upper level detects the CUBUSY signal, waits a predetermined time, and sends the input/output (I/O) command again.

If it is determined that no operation for an input/output (I/O) command is carried out in the input/output controller in the step 112, then in step 114 input/output controller sets the CUBUSY flags for all the ports connecting with the data processing apparatus (or system) int he upper level, at the step 114.

Figure 12:
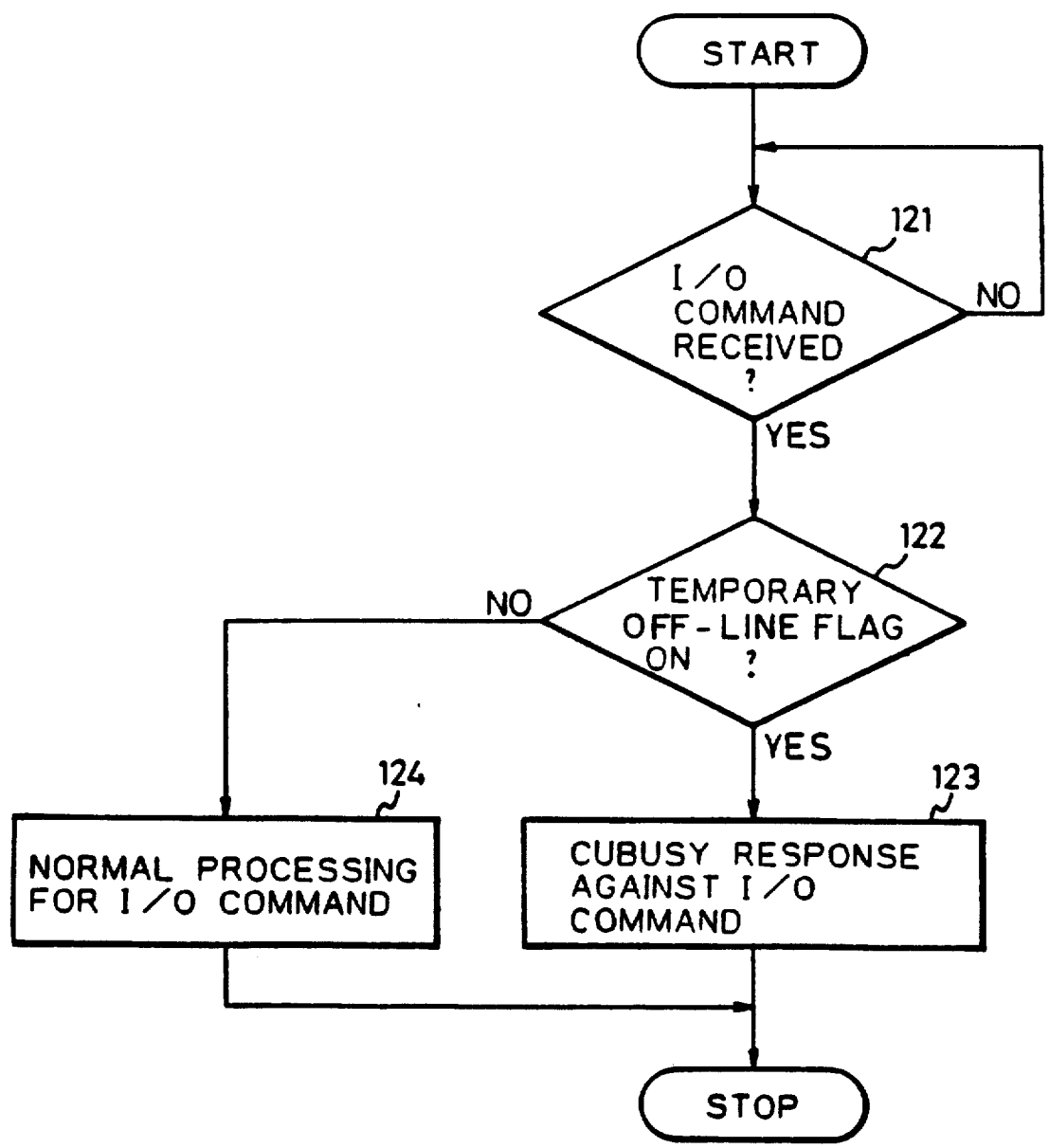

FIG. 12 shows the operation of the input/output controller wherein the temporary off-line flag is ON, when the input/output controller receives an input/output (I/O) command.

In the step 121 shown in FIG. 12, the input/output controller determines whether or not the input/output controller received an input/output (I/O) command.

If it is determined that an input/output (I/O) command is receive din the step 121, the operation goes to the step 122. On the other hand, if it is determined that an input/output (I/O) command is not received in the step 121, the input/output controller waits for a reception of an input/output (I/O) command in the step 121.

In the step 122, the input/output controller determines whether or not the temporary off-line flag 71 in the RAM 55 in the input/output controller is ON.

If it is determined that the temporary off-line flag 71 is ON, the operation goes to the step 123. Or if it is determined that the temporary off-line flag 71 is OFF, the operation goes to the step 124. In the step 123, the input/output controller sends the CUBUSY signal to the other input/output controller against the input/output (I/O) command due to the ON state of the temporary off-line flag, thus completing the operation of FIG. 12.

In the step 124, the input/output controller carries out a normal operation for the input/output (I/O) command, as the temporary off-line flag is OFF, thus completing the operation of FIG. 12.

Figure 13:
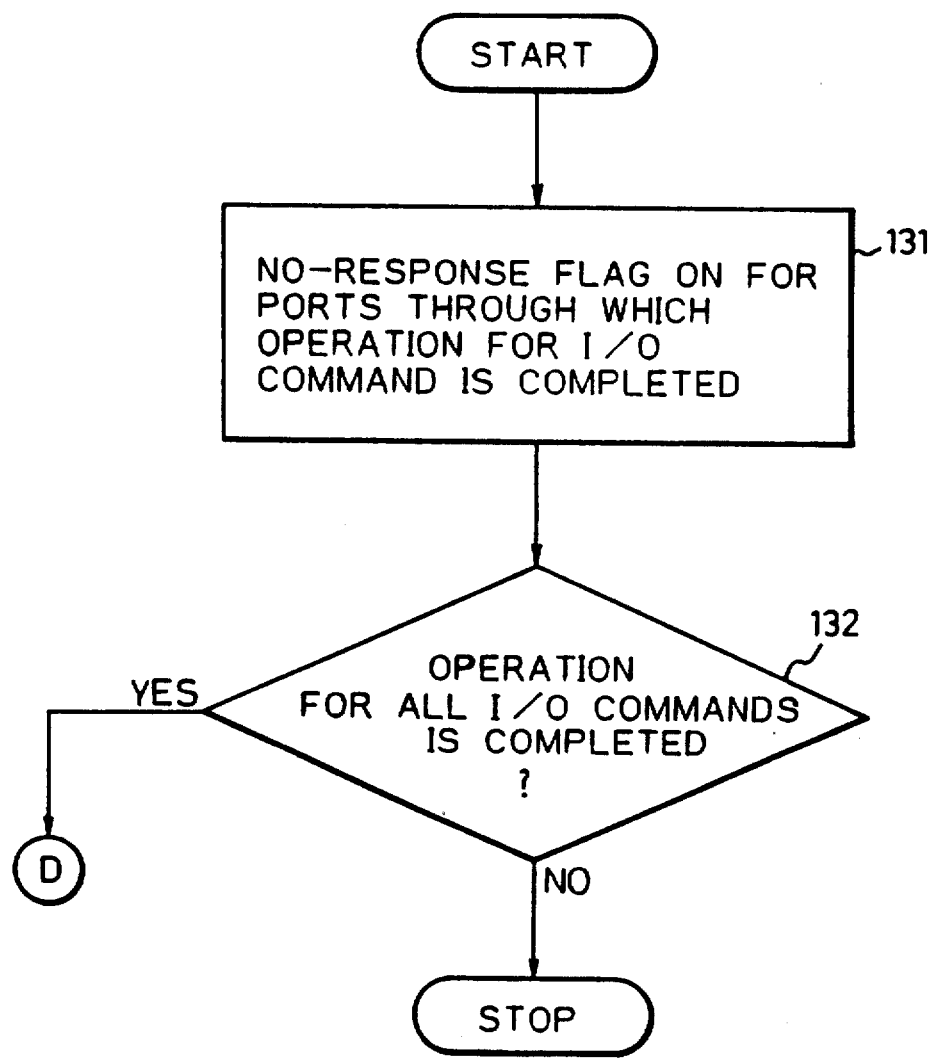

FIG. 13 shows the operation of the input/output controller wherein the temporary off-line flag is ON, after the aforementioned operation for the input/output (I/O) command of the step 112 of FIG. 11 is completed. As mentioned before, in the above operation, the series of input/output (I/O) commands which are chained to each other are deemed as one input/output (I/O) command.

When the above-mentioned operation form the input/output (I/O) command through the port is completed, in the step 131 shown in FIG. 13, the input/output controller sets the CUBUSY flag for the port, then the operation goes to the step 132.

In the step 132, the input/output controller determines whether or not the operations for an input/output (I/O) commands which have been received are completed. This determination is carried out by checking the CUBUSY flags for all the ports in the CUBUSY flag table 73.

Figure 14:
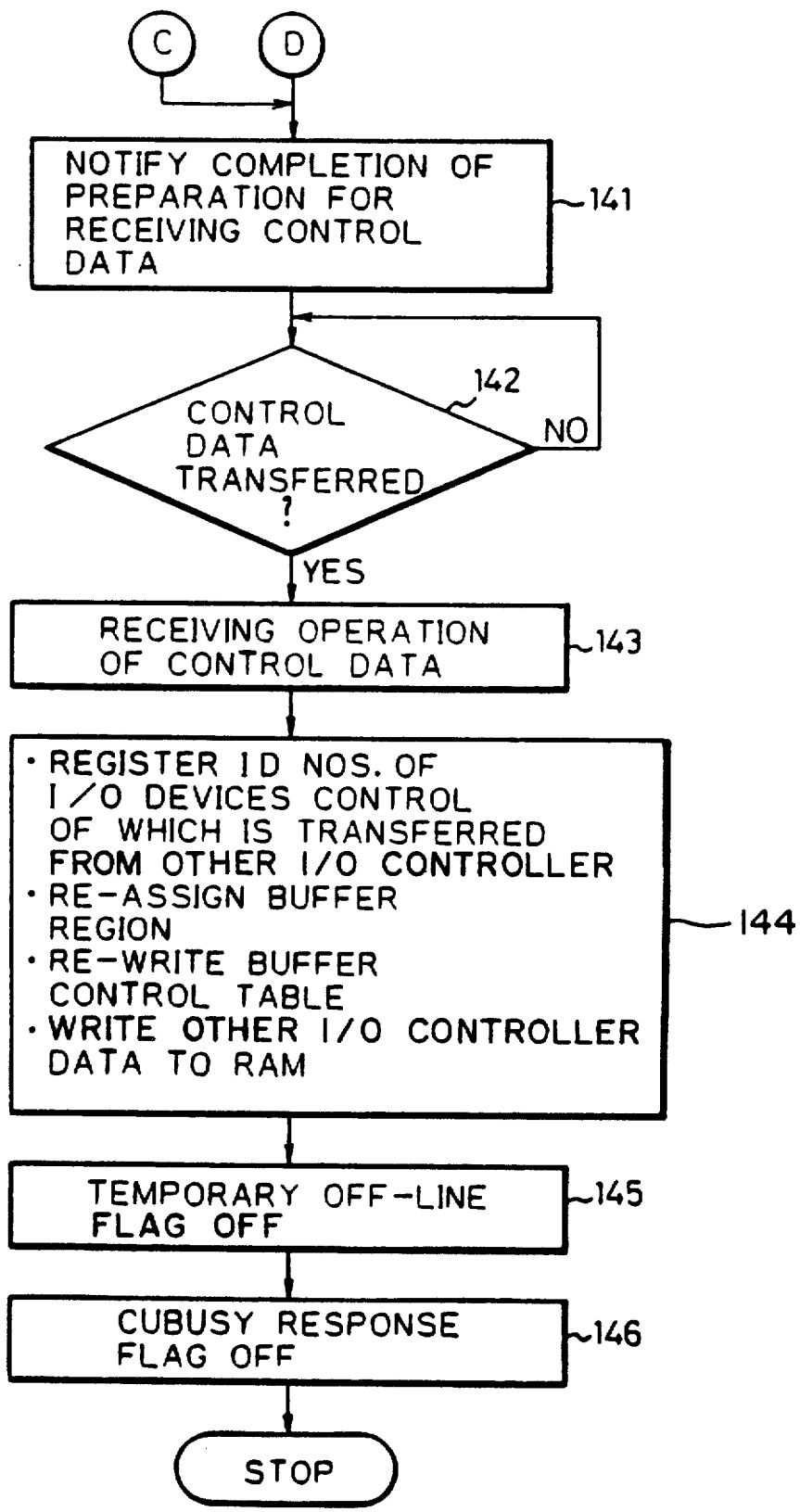

If it is determined in the step 132 that the operations for all the input/output (I/O) commands which have been received are completed, the operation goes to the step 141 of FIG. 14. Or if it is determined that an operation for an input/output (I/O) command which has been received is not completed, the operation of FIG. 13 is completed.

FIG. 14 shows the operation for restructing the input/output control system in the input/output controller, so that the input/output controller can control the both the peripheral devices which are originally (normally) under the control of the other input/output controller which is required to be in an off-line state and the peripheral devices under the control of its own input/output controller.

After the operations in the step 114 in FIG. 11 and step 132 of FIG. 13, in the step 141 of FIG. 14, the input/output controller notifies the other input/output controller that the preparation for receiving the cross call control data is completed. Then, in the step 142, the input/output controller waits for transfer of the cross call control data from the other input/output controller via the operation of the step 103 of FIG. 10.

If it is determined that the above cross call control data is transferred from the other input/output controller through the data path 3 and the interface control portion 60 and shown in FIG. 3, at the step 142, the operation goes to the step 143. In the step 143, input/output controller carries out a receiving operation of the transferred cross call control data, i.e., the transferred cross call control data is temporarily stored in a predetermined work area in the RAM 55.

In the step 144, restructuring of the input/output control system including restructing of the above cross call control data is carried out as follows.

First, the I. D. numbers of the peripheral devices which were originally under the control of the other input/output controller are stored as a part of the I. D. numbers of the peripheral devices under the control its own input/output controller. For example, the I. D. number of the I/O devices $15_1$, $15_2$, $15_3$, . . . originally under the input/output controller 10 in FIG. 1 are stored as a part of I.D. numbers of the peripheral devices under the control of its own input/output controller 20 in the RAM 55 of the input/output controller 20. As a result, the input/output controller 20 controls the data transfer operation between the data processing apparatus (or system) in the upper level and the peripheral devices $15_1$, $15_2$, $15_3$, . . . , $25_1$, $25_2$, $25_3$, . . . .

Secondly, the data region of the data buffer memory 56 must be re-assigned. An example of the reassignments of the data region is shown in FIG. 6, where it is assumed that each of the input/output controllers 10 and 20 originally controls eight peripheral devices $15_1$, $15_2$, $15_3$, $15_8$ and $25_1$, $25_2$, $25_3$, . . . $25_8$, respectively, as in FIG. 4. The re-assigned area to each input/output controller shown in FIG. 6 is a half of the originally assigned area shown in FIG. 4.

Corresponding with the above re-assignment of the data region of the data buffer memory 56, the buffer control table must also be re-written. In addition, the other data used for input/output control, including the data for controlling the bus 52, is re-set for restructuring the input/output control system.

Thus, the input/output controller wherein the above input/output control system is restructured can control a data transfer operation between a data processing apparatus (or system) and the peripheral devices which were originally under control of the other input/output controller which is required to be in an off-line state.

In the step 145, the temporary off-line flag in the RAM 55 is reset as the restructuring of the input/output control system is completed. In addition, the CUBUSY flag is reset at the step 146. Therefore, normal input/output control operations on the restructured input/output control system start.

I claim:

1. A system for restructuring an input/output control system having first and second input/output controller each respectively connects a group of peripheral devices and data processing apparatus, and controls data transfer operations of data between each of the group of peripheral devices and the data processing apparatus, each of the group of peripheral devices also connects the input/output controller corresponding to the other group of peripheral devices, the first input/output controller comprising:

first memory means for holding first control data used for controlling data transfer operations between the group of peripheral devices and the data processing apparatus;

first off-line situation notifying means for notifying an arising of a first situation, requiring the first input-/output controller to be in an off-line state, to the second input/output controller;

first on-response status indicating means for indicating a no-response status of the first input/output controller when the first situation arises in the first input/output controller;

first temporary stopping means for temporarily stopping a reception of a new I/O command in the first input/output controller when the first input/output controller receives notification of an arising of a second situation from the second input/output controller;

first temporary stop notifying means for notifying a temporary stop state of the first input/output controller to the second input/output controller;

first controller data transfer means for transferring the first control data held in the first memory means to a second memory means, when the first input/output controller receives notification of the temporary stop state from the second input/output controller;

first off-line means for carrying out an off-line operation of the first input/output controller after completion of the transfer of the first control data; and first restructuring means for receiving second control data from the second input/output controller and for restructuring the first control data held in the first memory means and the second control data transferred, so that the first input/output controller can control both the group of peripheral devices and the data processing apparatus; and the second input/output controller comprising:

said second memory means for holding the second control data used for controlling data transfer operation between the group of peripheral devices and the data processing apparatus;

second off-line situation notifying means for notifying an arising of the second situation, requiring the second input/output controller to be in an off-line state, to the first input/output controller;

second no-response status indicating means for indicating a no-response status of the second input/output controller when the second situation arises in the second input/output controller;

second temporary stopping means for temporarily stopping a reception of a new I/O command in the second input/output controller when the second input/output controller receives notification of an arising of the first situation from the first input/output controller;

second temporary stop notifying means for notifying a temporary stop state of the second input/output controller to the first input/output controller;

second control data transfer means for transferring the second control data held in the second memory means to the first memory means, when the second input/output controller receives notification of the temporary stop state from the first input/output controller;

second off-line means for carrying out an off-line operation of the second input/output controller after completion of the transfer of the second control data; and second restructuring means for receiving the first control data from the first input/output controller and for restructuring the second control data held in the second memory means and the first control data transferred, so that the second input/output controller can control both the group of peripheral devices and the data apparatus.

2. A system according to claim 1, wherein each of the first and second input/output controller further comprising data buffer memory means, having a region, for buffering the data transferred between the data processing apparatus and the group of peripheral devices, and wherein each of said first and second restructuring means further includes means for assigning the region of said data buffer memory means, so that each of said first and second restructuring means can further carry out a buffering operation of the data transferred between the data processing apparatus and the other group of peripheral devices.

3. A system according to claim 1, wherein the data processing apparatus includes a plurality of channels, wherein each of the first and second input/output controllers further comprises a plurality of ports, having respectively first and second parts, used for data transfer between the group of peripheral devices and the plurality of channels of the data processing apparatus, wherein said first temporary stopping means includes means for indicating a no-response status of the first input/output controller for the first part of said plurality of ports through which a data transfer operation for an I/O command is not carried out when the first situation of the first input/output controller arises, immediately after the first situation arises, and for indicating a no-response status of the first input/output controller for the second part of said plurality of ports through which a data transfer operation for an I/O command is carried out when the first situation of the first input/output controller arises, after the data transfer operation is completed, and wherein said second temporary stopping means includes means for indicating a no-response status of the second input/output controller for the first part of said plurality of ports through which a data transfer operation for an I/O command is not carried out when the second situation of the second input/output controller arises, immediately after the second situation arises, and for indicating a no-response status of the second input/output controller for the second part of said plurality of ports through which a data transfer operation for an I/O command is carried out when the second situation of the second input/output controller arises, after the data transfer operation is completed.

4. A system according to claim 1, wherein the data processing apparatus includes a plurality of channels, wherein each of the first and second input/output controllers further comprises a plurality of ports, having respectively first and second parts, used for data transfer between the group of peripheral devices and the plurality of channels of the data processing apparatus, and wherein said first temporary stopping means includes means for temporarily stopping a reception of a new I/O command at the first part of said plurality of ports through which a data transfer operation for an I/O command is not carried out when the first input/output controller receives notification of an arising of the second situation from the second input/output controller, immediately after the notification is received, and for temporarily stopping a reception of a second new I/O command at second part of said plurality of ports through which the data transfer operation for the I/O command is carried out when the first input/output controller receives the notification of an arising of the second situation from the second input/output controller, after the data transfer operation is completed.

5. A system according to claim 1 wherein the first situation requiring the first input/output controller to be in an off-line state includes, a malfunction situation when a malfunction has arisen in the first input/output controller, an off-line situation when the first input/output controller is ordered to be in an off-line state, and a power-off situation when the first input/output controller is ordered to power off.

6. A system according to claim 4, wherein said second temporary stopping means includes means for temporarily stopping a reception of a new I/O command at the first part of said plurality of ports through which a data transfer operation for an I/O command is not carried out when the second input/output controller receives notification of an arising of the first situation from the first input/output controller, immediately after the notification is received, and for temporarily stopping a reception of a second new I/O command at the second part of said plurality of ports through which the data transfer operation for the I/O command is carried out when the second input/output controller receives the notification of an arising of the first situation from the first input/output controller, after the data transfer operation is completed.

7. A method for performing an off-line operation in an input/output control system having a processor and first and second input/output controllers, each of the first and second controllers are operatively connected to first and second group or peripheral devices and the processor, the first input/output controller includes first control data corresponding to the first group of peripheral devices and the second input/output controller includes second control data corresponding to the second group of peripheral devices, said method comprising the steps of:

(a) notifying the second input/output controller of an off-line state occurring in the first input/output controller;
(b) setting a no-response indicator for the first input/output controller indicating that the first input/output controller is in the off-line state;
(c) transferring the first control data for the first group of peripherals from the first input/output controller to the second input/output controller to enable the second input/output controller to control the first and second group of peripheral devices; and
(d) performing the off-line operation to place the first input/output controller in the off-line state.

8. A method for restructuring an input/output control system having a processor and first and second input/output controllers, each of the first and second controllers are operatively connected to first and second group of peripheral devices and the processor, the first input/output controller includes first control data corresponding to the first group of peripheral devices and the second input/output controller includes second control data corresponding to the second group of peripheral devices, said method comprising the steps of:

(a) notifying the second input/output controller of an off-line state occurring in the first input/output controller;
(b) setting a no-response indicator for the first input/output controller indicating that the first input/output controller is in the off-line state;
(c) setting a temporary busy indicator for the second input/output controller indicating that the second input/output controller is in a temporary stop state;
(d) notifying the first input/output controller that the second input/output controller is in the temporary stop state;
(e) transferring the first control data for the first group of peripherals from the first input/output controller to the second input/output controller to enable the second input/output controller to control the first group of peripheral devices;
(f) restructuring the second control data of the second input/output controller to include the first control data transferred in step (e) to allow the second input/output controller to control the first and second of peripheral devices; and
(g) resetting the temporary busy indicator for the second input/output controller indicating that the second input/output controller is no longer in the temporary stop state.

* * * * *

UNITED STATES PATENT AND TRADEMARK OFFICE
CERTIFICATE OF CORRECTION

PATENT NO. : 5,088,029

DATED : February 11, 1992

INVENTOR(S) : Koyama

It is certified that error appears in the above-identified patent and that said Letters Patent is hereby corrected as shown below:

Col. 1, [56], line 3, "Jr." should be --Jr. et al.--.

Col. 2, line 33, "the above" should be --this--.

Col. 3, line 19, after "is" insert --necessary at some phase, e.g., checking, setting and--;
line 46, "controller" should be --control--;
line 51, "controller" should be --controllers--;
line 62, "or" should be --for--.

Col. 4, lines 16 and 17, "unit" should be --units--;
line 15, delete "restric";
line 16, change "tion" to --restructuring--;
line 17, change "restructing" to --restructuring--;
line 26, "i" should be --in--;
line 34, "operation" should be --operations--;
line 48, "FIG." should be --FIGS.--; after "illustrating" insert --operations--;
line 53, "FIG." should be --FIGS.--; after "illustrating" insert --operations--.

Col. 6, line 2, after "stop" delete the comma;
line 30, after "54" insert --denotes a power supply circuit 55 denotes a RAM 56--;
line 58, after "interface" insert --control portion 58 controls the data input/output--.

UNITED STATES PATENT AND TRADEMARK OFFICE
CERTIFICATE OF CORRECTION

PATENT NO. : 5,088,029

DATED : February 11, 1992

INVENTOR(S) : Koyama

It is certified that error appears in the above-identified patent and that said Letters Patent is hereby corrected as shown below:

Col. 7, line 11, "o" should be --on--.

Col. 8, line 54, "steps" should be --sets--.

Col. 9, line 21, after "the" (second occurrence) insert --input/output controller is sending the aforementioned--;

line 23, "state corresponding to" should be --thus completing the--.

Col. 10, line 55, delete "flag is ON, the CUBUSY signal is output";

line 56, delete "through the";

line 63, after "114" insert --the--;

line 66, "int he" should be --in the--.

Col. 11, line 7, "receive din" should be --received in--;

line 37, "form" should be --from--;

line 55, "restructing" should be --restructuring--.

Col. 9, line 23, after "response" insert --Flag --.

UNITED STATES PATENT AND TRADEMARK OFFICE
CERTIFICATE OF CORRECTION

PATENT NO. : 5,088,029

DATED : February 11, 1992

INVENTOR(S) : Koyama

PAGE 3 of 3

It is certified that error appears in the above-identified patent and that said Letters Patent is hereby corrected as shown below:

Col. 12, line 6, "and" should be --as--;
line 7, after "143" insert --the--;
line 13, "restructing" should be --restructuring--;
line 18, after "control" insert --of--;
line 20, "number" should be --numbers--;
line 31, "ments" should be --ment--;
line 34, after "15$_3$," insert --...,--.

Col. 13, line 20, "controller" should be --control--.

Signed and Sealed this

Twenty-fifth Day of April, 1995

Attest:

BRUCE LEHMAN

*Attesting Officer*   *Commissioner of Patents and Trademarks*